(12) United States Patent
Pallapolu et al.

(10) Patent No.: US 11,637,994 B2
(45) Date of Patent: *Apr. 25, 2023

(54) TWO-WAY INTERCEPT USING COORDINATE TRACKING AND VIDEO CLASSIFICATION

(71) Applicant: Bank of America Corporation, Charlotte, NC (US)

(72) Inventors: Kalyan Chakravarthy Pallapolu, Hyderabad (IN); Bharathi Tadepalli, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/382,216

(22) Filed: Jul. 21, 2021

(65) Prior Publication Data
US 2022/0038661 A1 Feb. 3, 2022

Related U.S. Application Data

(63) Continuation of application No. 16/940,606, filed on Jul. 28, 2020, now Pat. No. 11,108,996.

(51) Int. Cl.
*G06F 16/75* (2019.01)
*G06F 3/14* (2006.01)
(Continued)

(52) U.S. Cl.
CPC ............ *H04N 7/183* (2013.01); *G06F 16/75* (2019.01); *G06F 16/784* (2019.01); *G06N 3/04* (2013.01);
(Continued)

(58) Field of Classification Search
USPC ...... 348/169, 170, 171, 172, 208.14, 207.99
See application file for complete search history.

(56) References Cited

U.S. PATENT DOCUMENTS

| 1,018,623 | A | 2/1912 | Kenny et al. |
| 8,064,700 | B2 | 11/2011 | King et al. |

(Continued)

FOREIGN PATENT DOCUMENTS

| AU | 2016216630 A1 | 9/2016 |
| CA | 2770239 C | 1/2019 |

(Continued)

OTHER PUBLICATIONS

Pallapolu, K. C. et al., "Two-Way Intercept Using Coordinate Tracking and Video Classification," U.S. Appl. No. 16/940,606, filed Jul. 28, 2020, 28 pages.

*Primary Examiner* — Daquan Zhao

(57) ABSTRACT

A system comprising a coordinate tracking engine and a video classification engine communicably coupled to a notification engine. The coordinate tracking engine detects that geographical coordinates of a mobile device indicate that an account holder is within a threshold distance of a physical branch of an institution. The notification engine retrieves account information for the account holder. The coordinate tracking engine further detects that the account holder has arrived at the physical branch. The video classification engine captures video frames of an entrance to the physical branch and identifies the account holder. The notification engine further presents account information for the account holder on a display.

20 Claims, 4 Drawing Sheets

(51) Int. Cl.
*G06N 3/04* (2023.01)
*G06N 3/08* (2023.01)
*G06V 20/52* (2022.01)
*H04N 7/18* (2006.01)
*G06F 16/783* (2019.01)
*G06Q 10/107* (2023.01)
*H04W 4/029* (2018.01)
*G06V 40/16* (2022.01)
*G06V 10/82* (2022.01)

(52) U.S. Cl.
CPC ............ *G06N 3/08* (2013.01); *G06Q 10/107* (2013.01); *G06V 20/52* (2022.01); *G06V 40/172* (2022.01); *H04W 4/029* (2018.02); *G06F 3/14* (2013.01)

(56) References Cited

U.S. PATENT DOCUMENTS

| | | |
|---|---|---|
| 8,201,729 B1 | 6/2012 | Block et al. |
| 8,447,067 B2 | 5/2013 | Rhoads et al. |
| 8,457,367 B1 | 6/2013 | Sipe et al. |
| 8,640,946 B1 | 2/2014 | Block et al. |
| 8,818,034 B2 | 8/2014 | Zhang et al. |
| 9,004,353 B1 | 4/2015 | Block et al. |
| 9,158,904 B1 | 10/2015 | Ross et al. |
| 9,275,269 B1 | 3/2016 | Li et al. |
| 9,451,402 B2 | 9/2016 | Srivastava et al. |
| 9,483,798 B2 | 11/2016 | Kamiya |
| 9,513,015 B2 | 12/2016 | Estrella et al. |
| 9,538,332 B1 | 1/2017 | Mendelson |
| 9,569,658 B2 | 2/2017 | Johnson et al. |
| 9,607,483 B2 | 3/2017 | Block et al. |
| 9,633,389 B2 | 4/2017 | Carr et al. |
| 9,640,041 B2 | 5/2017 | Block et al. |
| RE46,731 E | 2/2018 | Woycik et al. |
| 10,055,853 B1 | 8/2018 | Fisher et al. |
| 10,115,277 B2 | 10/2018 | Branscomb et al. |
| 10,127,438 B1 | 11/2018 | Fisher et al. |
| 10,189,677 B2 | 1/2019 | Bryant et al. |
| 10,235,822 B2 | 3/2019 | Nye |
| 10,290,031 B2 | 5/2019 | Reid |
| 10,332,050 B2 * | 6/2019 | Hanson .................... H04W 4/33 |
| 10,547,968 B2 | 1/2020 | Jones |
| 10,733,631 B2 * | 8/2020 | Flowers ............... G06Q 20/108 |
| 11,108,996 B1 * | 8/2021 | Pallapolu ............ G06F 16/784 |
| 2014/0025540 A1 | 1/2014 | Hendrickson |
| 2014/0081858 A1 * | 3/2014 | Block ................ G06Q 20/1085 |
| | | 705/43 |
| 2014/0249949 A1 | 9/2014 | Keithley et al. |
| 2014/0376786 A1 | 12/2014 | Johnson et al. |
| 2015/0065161 A1 | 3/2015 | Ganesh et al. |
| 2016/0203499 A1 | 7/2016 | Yamashita et al. |
| 2018/0082111 A1 | 3/2018 | Golan et al. |
| 2018/0143999 A1 | 5/2018 | Jones |
| 2020/0162563 A1 | 5/2020 | Jones |

FOREIGN PATENT DOCUMENTS

| | | |
|---|---|---|
| EP | 2680191 B1 | 11/2019 |
| EP | 3614303 A1 | 2/2020 |
| WO | 2012166355 A1 | 12/2012 |
| WO | 2012166356 A1 | 12/2012 |
| WO | 2014139177 A1 | 9/2014 |
| WO | 2014210228 A1 | 12/2014 |

* cited by examiner and identifying the account holder in the captured video frames.

TWO-WAY INTERCEPT USING COORDINATE TRACKING AND VIDEO CLASSIFICATION

CROSS-REFERENCE TO RELATED APPLICATIONS

This application is a continuation of U.S. patent application Ser. No. 16/940,606 filed Jul. 28, 2020, by Kalyan Chakravarthy Pallapolu et al., and entitled "TWO-WAY INTERCEPT USING COORDINATE TRACKING AND VIDEO CLASSIFICATION," which is incorporated herein by reference.

TECHNICAL FIELD

The present disclosure relates generally to tracking and identification, and specifically to two-way intercept using coordinate tracking and video classification.

BACKGROUND

Tracking and identifying individuals is possible based on the popularity of wireless devices. For example, wireless devices may be used for tracking and providing information to individuals as they move throughout a geographic area.

SUMMARY

According to some embodiments, a system comprises a coordinate tracking engine and a video classification engine communicably coupled to a notification engine. The coordinate tracking engine detects that geographical coordinates of a mobile device of an institutional account holder indicate that the account holder is within a threshold distance of a physical branch of the institution. As an example, the coordinate tracking engine may receive a notification from a location based service on the account holder's mobile device when the account holder enters a two-block area near the building housing the institution.

The notification engine, in response to the coordinate tracking engine detecting that the geographical coordinates of the mobile device is within the threshold distance, retrieves account information for the account holder. For example, in anticipation of the account holder arriving at the institution, the notification engine may retrieve account information, such as recent transactions, associated with the account holder.

The coordinate tracking engine further detects that geographical coordinates of the mobile device of the account holder indicate that the account holder has arrived at the physical branch of the institution. For example, the coordinate tracking engine may receive a notification from the location based service on the account holder's mobile device that the account holder has traveled the two blocks and arrived at an entry or lobby area of the building.

The video classification engine captures video frames of an entrance to the physical branch of the institution where the account holder has arrived and identify the account holder in the captured video frames. For example, the video classification engine may use video cameras in or near the entry or lobby area to capture live video of account holders entering the building. The video classification engine may use facial recognition to detect that the account holder identified by the coordinate tracking engine has entered the building.

The notification engine further determines whether an institutional representative associated with the account holder is available at the physical branch. For example, the institution may have previously assigned a particular manager, customer service representative, or relationship manager to the account holder. Upon determining the institutional representative associated with the account holder is available, the notification engine notifies the institutional representative of the arrival of the account holder and present account information for the account holder to the institutional representative. For example, the relationship manager may receive an email or text that the account holder has arrived.

The embodiments described herein present several technical advantages. For example, some embodiments combine real time data, such as coordinate tracking and video classification, to predict a person's arrival at a particular location, such as an account holder or customer arriving at a branch office. Based on the predicted arrival, a notification system may efficiently assign branch office resources associated with the account holder or customer. For example, the account holder or customer may be entitled to certain perks. Efficiently assigning the branch office resources and perks may improve the customer service experience. The operation of the coordinate tracking information in conjunction with video classification information may reduce waiting times and reduce errors associated with data entry.

In particular embodiments, the operation of the coordinate tracking information in conjunction with the video classification information improves security. For example, facial recognition used with the video classification information may determine that the person entering with the mobile device is the account holder or customer associated with the mobile device.

In addition, the video classification information may improve the customer service experience because the manager, customer service representative, or relationship manager may be provided with a real-time image of the account holder or customer as they enter the building, which may be used to locate and/or identify the account holder or customer when greeting the account holder or customer.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Certain problems currently exist when providing personalized customer service upon customer arrival at an institution when a customer is to be connected with a particular customer representative. For example, a lag time exists between a customer's arrival at a facility and the customer receiving the services to be provided by the associates and/or employees of the facility. The lag time may be based on the limitations of current technology.

For example, the customer may arrive at the lobby of a facility where the customer waits in line for the next available service representative. In some embodiments, the customer may first be asked for identifying information, such as a social security number, an account number, and/or a driver's license. This process is time consuming and prone to user error (e.g., misheard or incorrectly entered account numbers, etc.).

Particular embodiments obviate the problems described above. For example, particular embodiments facilitate a real time two-way customer intercept using coordinate tracking and/or video classification. An example is illustrated in FIG. 1.

Figure 1:
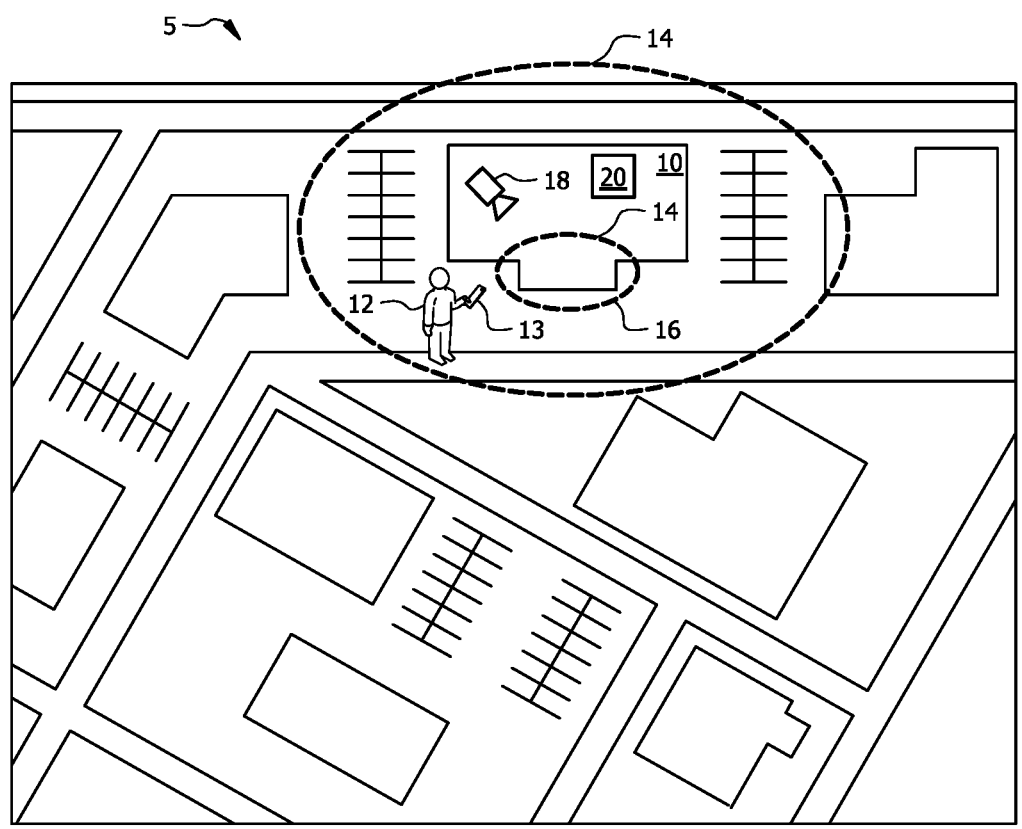
FIG. 1 is a block diagram of an example two-way intercept system.

FIG. 1 is a block diagram illustrating an example two-way intercept system 5. The example illustrates facility 10 and its surrounding buildings, streets, and parking lots. The two-way intercept system intercepts customer 12 upon arrival at facility 10. A customer intercept refers to an associate or employee of facility 10 interfacing with customer 12 to provide a service to customer 12.

In a particular non-limiting example, facility 10 may comprise a branch location of a financial institution and customer 12 may comprise an account holder of the financial institution. The financial institution may assign a relationship manager for each of its account holders. The relationship manager provides personal service to the account holder when the account holder visits the branch location. Upon arrival at the branch location, the relationship manager greets or intercepts the account holder to provide the desired services.

In particular embodiments, the customer intercept procedure is enhanced using synchronized coordinate tracking and/or video classification systems. In some embodiments, coordinate tracking is used to alert a relationship manager at facility 10 that customer 12 is near or at facility 10. Some embodiments may use location based services on a mobile device for coordinate tracking.

For example, customer 12 may carry mobile device 13. Mobile device 13 may comprise a smart phone, tablet, laptop computer, etc. In some embodiments, mobile device 13 may comprise a vehicle-based global positioning system (GPS) application or module.

As an example, an account holder of a financial institution may carry a smart phone with a mobile banking application installed. The mobile banking application may use location based services to determine that the account holder is near a branch location of the financial institution. Examples of location based services include services that use GPS, cell tower triangulation, WiFi, Bluetooth, etc. to determine geographic coordinates of the mobile device.

Particular embodiments may use one or more geofences to determine whether the account holder is near a branch location of the financial institution. For example, the mobile banking application may store the coordinates of one or more branch locations and a particular radius, zone, or area surrounding the branch locations. The particular radius, zone, or area comprises a virtual fence, or geofence, around the branch location.

The example illustrated in FIG. 1 comprises a first geofence 14 surrounding facility 10 and a second geofence 16 surrounding an entrance to facility 10 (e.g., lobby of facility 10). As customer 12 approaches facility 10, customer 12 may enter first geofence 14 which triggers a notification to notification system 20 (described in more detail with respect to FIG. 2), for example, at facility 10.

For example, upon entering first geofence 14, a mobile banking application on mobile device 13 may detect entrance to first geofence 14 and send a notification to notification system 20 at the branch location indicating that the account holder is near the branch location. Notification system 20 at the branch location may begin collecting records for the account holder in anticipation of the account holder's arrival at the branch location. In a particular embodiment, first geofence 14 may be set to a one mile radius (or other suitable radius that provides notification system 20 with advance notification).

After entering first geofence 14, customer 12 may pass by facility 10 without entering facility 10. Customer 12 may exit geofence 14, which triggers a notification to facility 10.

For example, the mobile banking application on mobile device 13 may detect exit of first geofence 14 and send a notification to notification system 20 at the branch location indicating that the account holder is no longer near the branch location. Notification system 20 may discard the previously collected records associated with the account holder.

Alternatively, customer 12 may proceed to enter facility 10. In doing so, customer 12 enters second geofence 16 surrounding an entrance to facility 10 which triggers a notification to facility 10. For example, the mobile banking application on mobile device 13 may detect entrance to second geofence 16 and send a notification to notification system 20 at the branch location indicating that the account holder has arrived at the branch location. Notification system 20 may alert a relationship manager that the account holder has arrived and may present the relationship manager with the previously collected records associated with the account holder.

In combination with the coordinate tracking, some embodiments include video classification. For example, facility 10 may include one or more cameras 18. Although camera 18 is illustrated within facility 10, in particular embodiments camera 18 may be positioned at any suitable location inside or outside facility 10 to capture images of customer 12 entering and at various locations within facility 10.

Camera 18 may be communicably coupled to notification system 20 at facility 10. Notification system 20 may perform facial recognition on the captured video to identify customer 12 entering facility 10. The facial recognition may be used for improved security (e.g., verifying that the person arriving with mobile device 13 is the account holder) and may be used for improved customer service (e.g., presenting a current image to the relationship manager to assist the relationship manager with locating the account holder in the lobby of the branch location).

Although in particular examples described herein, facility 10 comprises a branch location of a financial institution and customer 12 comprises an account holder of the financial institution, particular embodiments are similarly applicable to any facility 10 where an associate or employee provides personalized services for customer 12. Examples of facilities include, but are not limited to, organizations, businesses, government agencies, financial institutions, universities, etc.

Although geofences 14 and 16 are illustrated as a circle and oval, respectively, particular embodiments may include any suitable polygon or other shape to define a virtual area around facility 10 or an entrance to facility 10.

Figure 2:
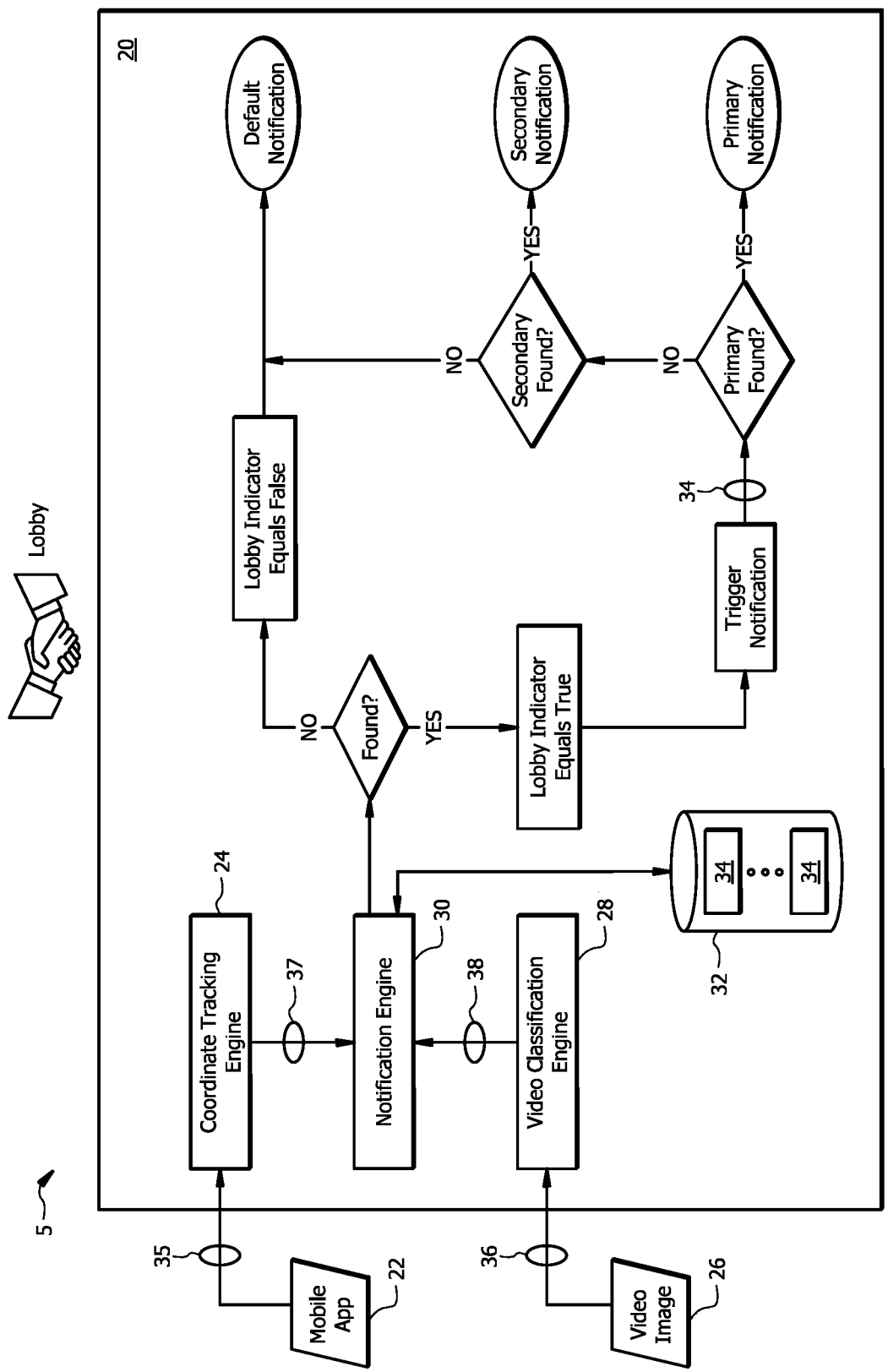
FIG. 2 is a flow diagram of a two-way intercept system, according to particular embodiments.

FIG. 2 is a flow diagram illustrating the operation of the two-way intercept system 5, according to particular embodiments. Two-way intercept system 5 includes notification system 20 communicably coupled to mobile application 22 (which may run on mobile device 13) and video image source 26. Notification system 20 comprises coordinate tracking engine 24, video classification engine 28, notification engine 30, and memory 32.

Coordinate tracking engine 24 may receive notifications from mobile application 22. For example, coordinate tracking engine 24 may receive indication 35 that customer 12 and mobile device 13, described with respect to FIG. 1, are within a threshold distance of facility 10 (e.g., customer 12 and mobile device 13 enter geofence 14). Alternatively, or in addition, coordinate tracking engine 24 may receive indication 35 that customer 12 and mobile device 13 have arrived at facility 10 (e.g., customer 12 and mobile device 13 enter geofence 16). Indication(s) 35 may include a location of customer 12 and/or an identifier of customer 12. The information in indication(s) 35 may be collectively referred to as coordinate tracking information 37. Coordinate tracking engine 24 may forward coordinate tracking information 37 to notification engine 30.

Video classification engine 28 receives live video 36 from a particular area of facility 10, such as an entrance or lobby, and performs one or more identification techniques, such as facial recognition, to identify customers in or entering facility 10. For example, camera 18, described with respect to FIG. 1, may transmit live video 36 to video classification engine 28. Video classification engine 28 may analyze the video to identify customers 12 as they enter facility 10. For example, video classification engine 28 may compare the captured image of a customer 12 to stored images of customers 12 to identify a particular customer 12. Video classification engine 28 may forward video classification information 38 about identified customers 12 to notification engine 30.

Video classification engine 28 may use any suitable image recognition technique. In some embodiments, video classification engine 28 uses a deep convolutional neural network (D-CNN) with Tensor Flow Object Detection API using a single shot detection (SSD) model, integrated with a scripting language, such as Python.

Notification engine 30 uses coordinate tracking information 37 sent by coordinate tracking engine 24 and/or video classification information 38 sent by video classification engine 28 to locate customer information 34 (e.g., account information) stored in memory 32. For example, coordinate tracking information 37 may include a customer identifier. Notification engine 30 may use the customer identifier to retrieve customer information 34 associated with the customer identifier.

In some embodiments, notification engine 30 may prefetch records associated with a customer. For example, notification location engine 30 may receive an indication that geographical coordinates of customer 12 indicate that customer 12 is within a threshold distance of facility 10 (e.g., mobile device 13 enters geofence 14). In response to this indication, notification engine 30 may collect customer information 34, such as account information, associated with customer 12 in anticipation of the arrival of customer 12.

In some embodiments, notification engine 30 may wait to collect customer information 34 associated with customer 12 until customer 12 arrives at facility 10 (e.g., mobile device 13 enters geofence 16).

Notification engine 30 may receive video classification information 38 about identified customers from video classification engine 28. In some embodiments, notification engine 30 matches an identified customer from video classification engine 28 with an identified customer from coordinate tracking engine 24.

In some embodiments, notification engine 30 may not receive coordinate tracking information 37 from coordinate tracking engine 24. For example, customer 12 may not be carrying mobile device 13 or the location based services on mobile device 13 may not be activated. In this case, notification engine 30 may identify and retrieve customer information 34 associated with customer 12 based on facial recognition performed, for example, when customer 12 arrives in the lobby of facility 10.

If based on one or both of coordinate tracking information 37 and video classification information 38, notification engine 30 identifies the customer, then notification engine 30 indicates that the customer has been found. In the illustrated example, notification engine 30 may set a "lobby indicator" flag to true.

In some embodiments, notification engine 30 uses collected customer information 34 for predictive analysis. For example, based on the customer's recent transaction, notification engine 30 may predict a reason for the customer's visit to the facility. For example, if the customer's recent transactions are related to a loan application, notification engine 30 may predict the purpose of the visit is to finalize a loan.

Notification engine 30 may store the time and location of each visit to facility 10. Notification engine 30 may use the stored information to identify patterns and predict future visits.

After determining customer 12 is present at facility 10, notification system 20 may notify an employee or associate of the arrival of customer 12. For example, notification system 20 may notify a relationship manager about the arrival of customer 12 via text message and/or email. If a primary relationship manager is not available, notification system 20 may notify a secondary relationship manager. If neither the primary or secondary relationship manger is available, notification system 20 may notify a default associate or employee, such as a lobby or front desk employee.

The notification may also include customer information 34, such as account information, associated with customer 12. Customer information 34 may be part of the email or text notification, or customer information 34 may be made available to the associate or employee via a terminal device or display coupled to notification system 20.

Customer information 34 may include results of the predictive analysis, such as the customer's predicted reason for visiting the facility. Customer information 34 may include results of the video classification. As one example, customer information 34 may include an image of customer 12. As another example, the video classification may not have successfully recognized customer 12 because customer 12 was wearing clothing that prevented recognition (e.g., hat, scarf, sunglasses, etc.) or customer 12 was obscured by other customers in the video. In such a scenario, customer information 34 may include an indication that the associate or employee should ask for further identification upon intercepting customer 12.

Accordingly, the customer experience is enhanced because waiting times are reduced. The waiting times are reduced because the two-way intercept automatically identifies and notifies a relationship manager upon customer arrival.

If based on one or both of coordinate tracking information 37 and video classification information 38, notification engine 30 is not able to identify customer 12, then notification engine 30 indicates that the customer has not been found. In the illustrated example, notification engine 30 may set a "lobby indicator" flag to false.

When the lobby indicator flag is set to false, notification system 20 may send a notification to a default associate or employee, such as a lobby or front desk employee. Notification system 20 may determine that customer 12 is a new customer and pre-populate some customer information, such as an image of customer 12 from video classification engine 28 and/or the time and date the customer arrived at facility 10.

Figure 3:
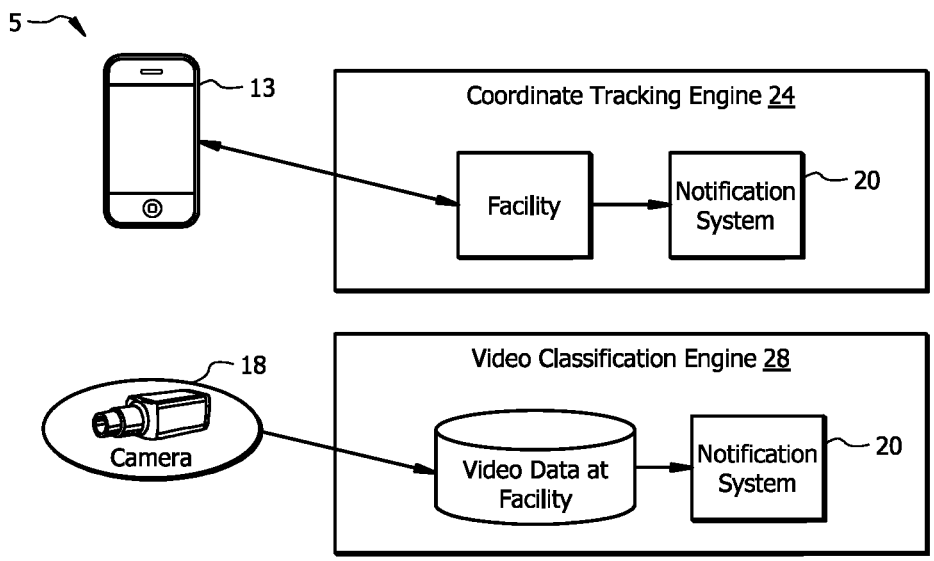
FIG. 3 is a block diagram of a two-way intercept system, according to particular embodiments.

FIG. 3 is a block diagram of a two-way intercept system 5, according to particular embodiments. The block diagram illustrates that coordinate tracking engine 24 and video classification engine 28 may operate independently or in conjunction with each other. In a particular embodiment, coordinate tracking engine 24 and video classification engine 28 not only operate in conjunction with each other, but are also synchronized in timing with each other.

For example, notification system 20 may include coordinate tracking engine 24 that is communicably coupled to mobile device 13, as described above with respect to FIGS. 1 and 2. Notification system 20 may include video classification engine 28 communicably coupled to camera 18, as described above with respect to FIGS. 1 and 2. Coordinate tracking engine 24 and video classification engine 28 may operate independently in that either engine alone may be used to detect an arrival of customer 12 at facility 10. When coordinate tracking engine 24 and video classification engine 28 operate in conjunction with each other (i.e., two-way intercept), particular advantages are that a false positive error rate is reduced and security is increased because the two engines 24 and 28 work together (e.g., facial recognition is performed in addition to coordinate tracking).

Figure 4:
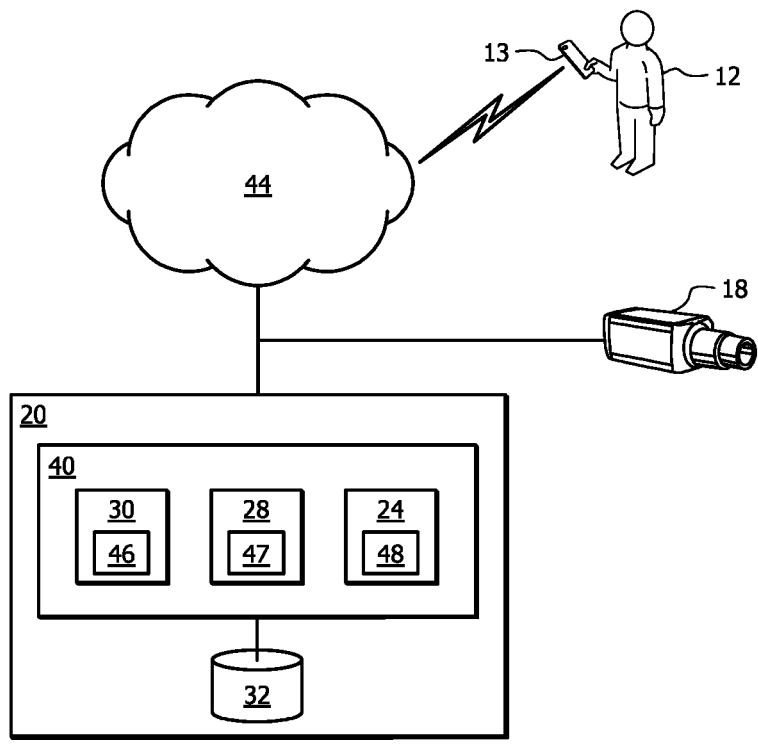
FIG. 4 is a block diagram illustrating an example notification system, according to some embodiments.

FIG. 4 is a block diagram illustrating an example notification system 20, according to some embodiments. Notification system 20 is communicably coupled to mobile device 13 associated with customer 12 and communicably coupled to camera 18 via network 44.

Network 44 comprises a plurality of network nodes configured to communicate data between one or more of mobile device 13, camera 18, and notification system 20. In particular embodiments, not all components are configured to communicate with every other component. For example, in some embodiments mobile device 13 may communicate with notification system 20, but not with camera 18.

Examples of network nodes include, but are not limited to, routers, switches, modems, web clients, and web servers. Network 44 comprises any suitable type of wireless and/or wired network including, but not limited to, all or a portion of the Internet, the public switched telephone network, a cellular network, and/or a satellite network. Network 44 is configured to support any suitable communication protocols as would be appreciated by one of ordinary skill in the art upon viewing this disclosure.

Examples of camera 18 include, but are not limited to, analog cameras and digital cameras. Examples of digital cameras include charge-coupled device (CCD) cameras and complementary metal-oxide semiconductor (CMOS) cameras. Camera 18 may include a closed circuit television camera (CCTV). Camera 18 may include a box camera, dome camera, pan tilt zoom (PTZ) camera, bullet camera, Internet Protocol (IP) camera, day/night camera, thermal camera, wired or wireless camera, etc.

Camera 18 is configured to capture images of people entering facility 10. Camera 18 may be configured to capture images continuously, at predetermined intervals, or on-demand. For example, camera 18 may be configured to capture an image or images when coordinate tracking engine 24 determines a person arrives at facility 10. In another example, camera 18 is configured to continuously capture images as a video stream. Camera 18 may be communicably coupled to one or more processors 40 and provide images to the one or more processors 40 for performing, for example, facial recognition to identify people, such as customer 12 arriving at facility 10.

Notification system 20 includes one or more processors 40 communicably coupled to memory 42. One or more processors 40 may be implemented as one or more central processing unit (CPU) chips, logic units, cores (e.g., a multi-core processor), field-programmable gate array (FPGAs), application specific integrated circuits (ASICs), or digital signal processors (DSPs). The one or more processors 40 are configured to execute one or more sets of instructions 46, 47, 48 to implement one or more of coordinate tracking engine 24, video classification engine 28, and notification engine 30.

Coordinate tracking engine 24 is configured to receive indications regarding geographic coordinates of a mobile device 13 and forward coordinate tracking information 37 to notification engine 30 according to any of the embodiments and examples described herein.

Video classification engine 28 is configured to capture and analyze video and forward video classification information 38 to notification engine 30 according to any of the embodiments and examples described herein.

In one embodiment, notification engine 30 is configured to synchronize the timing of operation of coordinate tracking information 37 and video classification information 38 associated with a customer, and based on customer information, notify an associate, employee, or representative to intercept the customer according to any of the embodiments and examples described herein.

Memory 32 comprises one or more disks, tape drives, or solid-state drives, and may be used as an over-flow data storage device, to store programs when such programs are selected for execution, and to store instructions (e.g., instructions 46, 47, and 48) and data that are read during program execution, such as instructions and logic rules. Memory 32 may be volatile or non-volatile and may comprise read only memory (ROM), random access memory (RAM), ternary content-addressable memory (TCAM), dynamic RAM (DRAM), and/or static RAM (SRAM). Memory 32 may comprise cloud storage.

Memory 32 is operable to store, for example, customer information 34. Customer information 34 may include account information (e.g., user identifier, alias, account number, account type, routing number, account balance, billing address, shipping address, email address, phone number, expiration date, member number, transaction history, etc.), security information (security number, personal identification number, biometric information, etc.), or any other information associated with a customer, such as customer 12. In some embodiments, the biometric information may include images and/or voiceprints associated with a customer.

Figure 5:
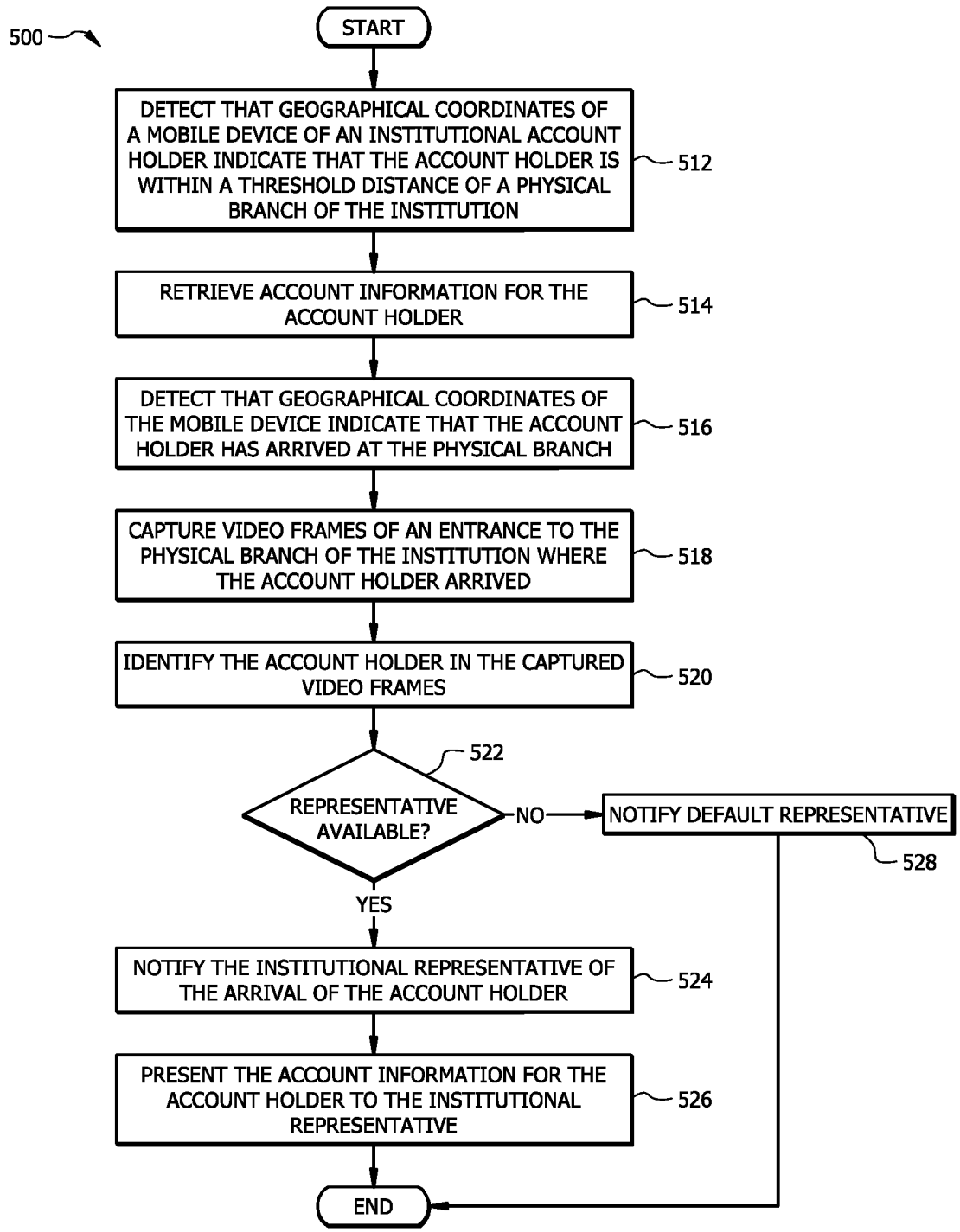
FIG. 5 is a flowchart illustrating a method in a notification system, according to particular embodiments.

FIG. 5 is a flowchart illustrating a method in a notification system, according to particular embodiments. Method 500 may be performed by notification system 20 described with respect to FIGS. 2-4.

The method begins at step 512, where notification system 20 detects that geographical coordinates of mobile device 13 of an institutional account holder indicate that the account holder is within a threshold distance of a physical branch of the institution. For example, with respect to FIG. 1, a notification system 20 associated with a physical branch of an institution (e.g., notification system 20 associated with facility 10) may receive an indication from mobile device 13 associated with an account holder of the institution (e.g., customer 12) when the account holder enters geofence 14.

In FIG. 1, the threshold distance is illustrated as geofence 14 of a particular radius (e.g., a physical distance in yards, meters, city blocks, etc. around facility 10). In some embodiments, the geofence may take the form of a polygon or any other suitable shape containing or partially containing facility 10.

In some embodiments, the threshold distance is based on an amount of time before the account holder reaches the physical branch of the institution (e.g., facility 10) based on the geographical coordinates of the mobile device 13 and a rate of travel of mobile device 13. For example, a threshold distance for an account holder traveling by car may be a greater distance than a threshold distance for a pedestrian account holder. For example, notification system 20 may want to be notified when an account holder is five minutes away from the physical branch. For an account holder travelling by car, the threshold distance may be 1 mile, but for a pedestrian account holder the threshold distance may be 2 blocks.

In some embodiments, the indication may include information such as a customer identifier. In some embodiments, the indication may include a time estimate of when the customer will arrive at the facility. In some embodiments, based on the indication, notification system 20 may calculate when the customer will arrive at facility 10.

At step 514, notification system 20 retrieves account information (e.g., customer information 34) for the account holder in response to detecting that the geographical coordinates of mobile device 13 is within the threshold distance. For example, when the account holder enters geofence 14, notification system 20 may retrieve account information for the account holder, such as transaction history information, primary and secondary relationship manager, etc. Thus, when and if the account holder arrives at facility 10, the account information is already available for the relationship manager, which reduces waiting time for the account holder.

At step 516, notification system 20 detects that geographical coordinates of mobile device 13 associated with the account holder indicate that the account holder has arrived at the physical branch of the institution. For example, notification system 20 may receive a notification from mobile device 13 associated with an account holder of facility 10 when the account holder enters geofence 16. Similar to geofence 14, geofence 16 may take the form of a polygon or any other suitable shape containing or partially containing an entrance to facility 10.

At step 518, notification system 20 captures video frames of an entrance to the physical branch of the institution where the account holder has arrived. For example, notification system 20 may receive video frames from camera 18.

At step 520, notification system 20 identifies the account holder in the captured video frames. For example, notification system 20 may identify faces within the captured video frames. Notification system 20 may compare the identified faces to stored images of account holder faces. Notification system 20 may further coordinate an identified account holder with an identity of the account holder for which coordinate tracking information was received at steps 512 and 516.

An advantage of combining video classification information 28 with coordinate tracking information 37 is enhanced security. For example, if the facial recognition matches the account holder associated with mobile device 13, then the relationship manager can be confident the account holder is legitimate. If the facial recognition is inconclusive, then the relationship manager can ask for further identification.

At step 522, notification system 20 determines whether an institutional representative associated with the account holder is available at the physical branch. For example, notification system 20 may query a work schedule database; notification system 20 may query presence information; and/or notification system 20 may message the institutional representative, etc.

Upon determining the institutional representative associated with the account holder is available, the method continues to step 524 where notification system 20 notifies the institutional representative of the arrival of the account holder at facility 10. For example, notification system 20 may send a text message and/or electronic email to the institutional representative.

At step 526, notification system 20 presents account information (e.g., customer information 34) for the account holder to the institutional representative. The account information may be presented as part of the text or email notification, or the account information may be presented on a display, such as a terminal device coupled to notification system 20.

The account information may include transactional history, a predicted reason for the account holder's visit, and other suitable account information. The account information may include an image of the account holder. The image may comprise a previously stored image of the account holder, or a near real time image of the account holder captured from the video frames.

If at step 522 notification system 20 determines an institutional representative associated with the account holder is not available at the physical branch, the method continues to step 528, where notification system 20 notifies a default institutional representative, such as a lobby representative.

Modifications, additions, or omissions may be made to the method of FIG. 5. Additionally, one or more steps in method 500 of FIG. 5 may be performed in parallel or in any suitable order.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A two-way intercept system comprising:
a coordinate tracking engine and a video classification engine communicably coupled to a notification engine;
the coordinate tracking engine comprising a memory coupled to one or more processors, the memory comprising instructions that, when executed by the one or more processors, are operable to detect that geographical coordinates of a mobile device of an institutional account holder indicate that the account holder is within a threshold distance of a physical branch of the institution;
the notification engine comprising a display and a memory coupled to one or more processors, the memory comprising instructions that, when executed by the one or more processors, are operable to in response to the coordinate tracking engine detecting that the geographical coordinates of the mobile device is within the threshold distance, retrieve account information for the account holder;
the coordinate tracking engine further operable to:
detect that geographical coordinates of the mobile device of the account holder indicate that the account holder has arrived at the physical branch of the institution;
the video classification engine comprising a camera and a memory coupled to one or more processors, the memory comprising instructions that, when executed by the one or more processors, are operable to:
capture video frames of an entrance to the physical branch of the institution where the account holder has arrived;
identify the account holder in the captured video frames;
the notification engine further operable to present account information for the account holder on a display.

2. The system of claim 1, the notification engine further operable to present an image of the account holder on the display.

3. The system of claim 2, wherein the image of the account holder is sourced from the captured video.

4. The system of claim 1, the notification engine further operable to present a location of the account holder within the physical branch on the display.

5. The system of claim 1, wherein the notification engine is operable to notify an institutional representative of the arrival of the account holder by sending one or more of a text message or electronic mail to the institutional representative.

6. The system of claim 1, wherein the video classification engine is further operable to identify the account holder in the captured video frames by converting each video frame to a blob and using deep convolutional neural network with tensor flow object detection to perform facial recognition to identify the account holder.

7. The system of claim 1, the coordinate tracking engine is further operable to estimate an arrival time of the account holder at the physical branch based on geographical coordinates of the mobile device of the account holder.

8. The system of claim 1, wherein the coordinate tracking engine is operable to detect that geographical coordinates of the mobile device of the institutional account holder indicate that the account holder is within the threshold distance of a physical branch of the institution by receiving an indication from the mobile device that a location based service on the mobile device has determined that the mobile device has entered a first geofence area that includes the physical branch of the institution.

9. The system of claim 8, wherein the indication from the mobile device further comprises an identifier of the account holder.

10. The system of claim 8, wherein the coordinate tracking engine is operable to detect that geographical coordinates of the mobile device of the account holder indicate that the account holder has arrived at the physical branch of the institution by receiving an indication from the mobile device that a location based service on the mobile device has determined that the mobile device has entered a second geofence area that includes the physical branch of the institution, wherein the second geofence area is different than the first geofence area.

11. The system of claim 1, wherein the threshold distance comprises a physical distance from the physical branch of the institution.

12. The system of claim 1, wherein the threshold distance is based on an amount of time before the account holder reaches the physical branch of the institution based on the geographical coordinates of the mobile device and a rate of travel of the mobile device.

13. A method comprising:
detecting that geographical coordinates of a mobile device of an institutional account holder indicate that the account holder is within a threshold distance of a physical branch of an institution;
retrieving account information for the account holder in response to detecting that the geographical coordinates of the mobile device are within the threshold distance;
detecting that geographical coordinates of the mobile device of the account holder indicate that the account holder has arrived at the physical branch of the institution;
capturing video frames of an entrance to the physical branch of the institution where the account holder has arrived;
identifying the account holder in the captured video frames; and
presenting the account information for the account holder on a display.

14. The method of claim 13, further comprising presenting an image of the account holder on the display, wherein the image of the account holder is sourced from the captured video.

15. The method of claim 13, further comprising presenting a location of the account holder within the physical branch on the display.

16. The method of claim 13, wherein identifying the account holder in the captured video frames comprises converting each video frame to a blob and using deep convolutional neural network with tensor flow object detection to perform facial recognition to identify the account holder.

17. The method of claim 13, wherein:
detecting that geographical coordinates of the mobile device of the institutional account holder indicate that the account holder is within the threshold distance of a physical branch of the institution comprises receiving an indication from the mobile device that a location based service on the mobile device has determined that the mobile device has entered a first geofence area that includes the physical branch of the institution; and detecting that geographical coordinates of the mobile device of the account holder indicate that the account holder has arrived at the physical branch of the institution comprises receiving an indication from the mobile device that a location based service on the mobile device has determined that the mobile device has entered a second geofence area that includes the physical branch of the institution, wherein the second geofence area comprises is different area than the first geofence area.

18. The method of claim 17, wherein the indication from the mobile device further comprises an identifier of the account holder.

19. The method of claim 13, wherein the threshold distance comprises a physical distance from the physical branch of the institution.

20. The method of claim 13, wherein the threshold distance is based on an amount of time before the account holder reaches the physical branch of the institution based on the geographical coordinates of the mobile device and a rate of travel of the mobile device.

\* \* \* \* \*